United States Patent [19]
Kirk et al.

[11] Patent Number: 5,562,892
[45] Date of Patent: Oct. 8, 1996

[54] PROCESS FOR THE PRODUCTION OF ALPHA HEMIHYDRATE CALCIUM SULFATE FROM FLUE GAS SLUDGE

[76] Inventors: Donald W. Kirk, Dept. of Chemical Engineering & Applied Chemistry, University of Toronto, Toronto, Canada, M5S 1A4; Shitang Tong, Dept of Chemical Engineering, Wuhan Iron & Steel University, Wuhan, Hubei, China, 430081

[21] Appl. No.: 378,272

[22] Filed: Jan. 26, 1995

[51] Int. Cl.$^6$ .................................................. C01F 11/46
[52] U.S. Cl. .................................... 423/555; 106/772
[58] Field of Search ........................... 106/772; 423/555

[56] References Cited

U.S. PATENT DOCUMENTS

| | | | |
|---|---|---|---|
| 3,337,298 | 8/1967 | Ruter et al. | 423/555 |
| 4,069,300 | 1/1978 | Akazawa et al. | 423/555 |
| 4,091,080 | 5/1978 | Kosugi et al. | 423/555 |
| 4,108,677 | 8/1978 | Valiga | 423/555 |
| 4,842,842 | 6/1989 | Kudo | 423/555 |
| 4,976,936 | 12/1990 | Rathi et al. | 423/555 |
| 5,015,449 | 5/1991 | Koslowski | 106/772 |
| 5,248,487 | 9/1993 | Bold et al. | 423/555 |

OTHER PUBLICATIONS

Chemical Abstracts Citation 89: 134636.
Chemical Abstracts, vol. 80, 1974, No. 99601h—German 1,767,937.
Chemical Abstracts, vol. 87, 1977, No. 87159b—German Offen 2,646,347.
Chemical Abstracts, vol. 87, 1977, No. 105949r—JP Kokai 77 48 594.
Chemical Abstracts, vol. 88, 1978, No. 65189e—JP Kokai 77 131,994.
Chemical Abstracts, vol. 88, 1978, No. 65191z—JP Kokai 77 120,977.
Chemical Abstracts, vol. 88, 1978, No. 65192a—JP Kokai 77 120,996.
Chemical Abstracts, vol. 89, 1978, No. 151562y—JP Kokai 76 127,588.
Chemical Abstracts, vol. 89, 1978, No. 151563a—JP Kokai 78 51,199.
Chemical Abstracts, vol. 91, 1979, No. 8816v—JP Kokai 79 04,897.
Chemical Abstracts, vol. 91, 1979, No. 8820s—JP Kokai 79 28,792.
Chemical Abstracts, vol. 91, 1979, No. 111687c—JP Kokai 79 61,098.
Chemical Abstracts, vol. 94, 1981, No. 194405v—JP Kokai 80,136,122.
Chemical Abstracts, vol. 96, 1982, No. 220056v—Belgium BE 888,941.
Chemical Abstracts, vol. 96, 1982, No. 222333g—EP Pat.Appln EP 44,005.
Chemical Abstracts, vol. 96, 1982, No. 222336k—JP Kokai 82 11,822.
Chemical Abstracts, vol. 96, 1982, No. 125556z—JP Kokai 81,149,322.
Chemical Abstracts, vol. 98, 1983, No. 74851y—Belgium BE 893,099.
Chemical Abstracts, vol. 99, 1983, No. 9974x—NETH Appln NL 82 03,014.
Chemical Abstracts, vol. 106, 1987, No. 218697m—German Offen DE 3,534,390.

(List continued on next page.)

*Primary Examiner*—Wayne Langel
*Attorney, Agent, or Firm*—Cushman Darby & Cushman, L.L.P.

[57] ABSTRACT

Process for producing alpha-hemihydrate calcium sulfate from FGD sludge comprising treating an aqueous slurry of the sludge with a stabilizing effective amount of a stabilizing polyhydric alcohol to stabilize the αHH to obtain αHH crystal growth, at atmospheric pressure and a temperature greater than 80° C. and a pH selected from 3 to 6. The polyhydric alcohol may be selected from ethylene glycol, glycerol and a carbohydrate. The process offers a commercially viable method of making αHH from FGD sludge wastes.

13 Claims, 5 Drawing Sheets

OTHER PUBLICATIONS

Chemical Abstracts, vol. 106, 1987, No. 89323k—German Offen DE 3,522,495.

Chemical Abstracts, vol. 110, 1989, No. 195796j—JP Kokai 63,274,615.

Chemical Abstracts, vol. 110, 1989, No. 195808q—JP Kokai 63 282,117.

Chemical Abstracts, vol. 120, 1994, No. 225263j—US 5,248,487.

Chemical Abstracts, vol. 106, 1987, No. 218697m—German Offen DE 3,534,390.

PROCESS FOR THE PRODUCTION OF ALPHA HEMIHYDRATE CALCIUM SULFATE FROM FLUE GAS SLUDGE

FIELD OF THE INVENTION

This invention relates to alpha hemihydrate calcium sulfate ($\alpha$HH), particularly to a process for the production of $\alpha$HH from flue gas desulfurization materials, and more particularly to plasterboard comprising $\alpha$HH.

BACKGROUND OF THE INVENTION

In this application, the terms gypsum, FGD, calcium sulfate, calcium sulfite, calcium sulfate dihydrate, calcium sulfate hemihydrate, alpha gypsum plaster, alpha calcium sulfate hemihydrate, beta calcium sulfate hemihydrate and calcium sulfate anhydride are used. These various forms of calcium containing compounds require definition.

Gypsum is a mineral having the formula $CaSO_4.2H_2O$, which in pure form or when the number of water molecules in the crystal is to be emphasized, is referred to as calcium sulfate dihydrate (CAS Registry number 10101-41-4). About 55 million tonnes of gypsum are used in industry each year. About one-half is processed by partial dehydration to beta calcium sulfate hemihydrate, $\beta CaSO_4.0.5H_2O$ (CAS registry No 10034-76-1) commonly called "plaster of Paris". The beta calcium sulfate hemihydrate is used in the wallboard industry. At present, almost all of the commercial material is derived from mineral sources. This commercial product is never pure but has a minimum of 80% $\beta CaSO_4.0.5H_2O$. Complete dehydration produces calcium sulfate anhydrite (or simply "anhydrite") $CaSO_4$ (CAS registry No. 7778-18-9).

Synthetic gypsum, $CaSO_4.2H_2O$, (as opposed to the "natural" mineral gypsum), is available in North America in very large quantities, although until recently it was not used by the Gypsum Industry. Objections to its use arose because of the presence of impurities, its undesirable very fine physical state, its production in a wet state and its different handling characteristics. Synthetic gypsum is produced as a by-product from chemical processes, such as stack gas scrubbing. The waste from stack gas scrubbing contains calcium sulfite ($CaSO_3$), calcium sulfate ($CaSO_4.2H_2O$), and residual limestone ($CaCO_3$). It is produced as a slurry commonly referred to as FGD (flue gas desulfurization) wastes.

The thermal dehydration of "natural" gypsum to produce calcium sulfate hemihydrate has been the subject of much theoretical and practical study. Two forms of the hemihydrate have been identified. The most common is aforesaid $\beta CaSO_4.0.5H_2O$ which is produced industrially by dehydration at about 100° C. The other form is aforesaid alpha, which is produced under conditions above 97° C. in saturated steam. Although chemically identical to the $\beta$ form, this $\alpha CaSO_4.0.5H_2O$ is considered a specialty product and is referred to as "alpha plaster". The importance of the difference in form and behaviour of these two hemihydrates may be appreciated by the 1992 market values. $\beta CaSO_4.0.5H_2O$ commanded a price of about US$16 per short ton while $CaSO_4.5H_2O$ reached US$300 per short ton. Despite the difference in price, there is still some controversy in the literature in defining the form.

A practical method of distinguishing the two forms has been to use the amount of water required to make a flowable paste from 100g of a hemihydrate. The alpha form has a "low" water demand of 30g–40g, while the beta form has a relatively higher water demand of 75g–90g. In addition to this practical water demand test, Differential Scanning Calorimetry (DSC) may be used as an analytical technique to distinguish the two forms. In the test, a sample is heated and the amount of heat absorbed and released by the sample is measured. The alpha form displays a characteristic exothermic peak on the chromatogram suitable for identifying and roughly quantifying the amount of alpha in the sample. One characteristic of the alpha form is that the form has larger, squat or columnar crystals as compared to the tiny, irregular crystals of the beta form. There is also a needle-like crystal habit of the alpha form that does not have the desired low water demand but which is characterized as alpha in the DSC tests.

Thus, in this specification and claims the term alpha calcium sulfate hemihydrate means the squat, columnar crystals of calcium sulfate hemihydrate that have the low water demand of <40g water per 100g solids and have the characteristic isotherm trace on a differential scanning calorimetry (DSC) thermogram.

Markets for alpha plaster make use of the low water demand characteristic to obtain the dense, high strength, hydrated gypsum product produced therefrom. In North America, between 150,000 and 200,000 short tons are produced which is mainly used in moulding and casting plasters, dental plasters, art and statuary plasters, pattern and model making and in self-levelling floor mortars and wellcastings. We believe that the growth of the alpha plaster market has been limited by its cost and not its desirable properties.

The commercial processes for producing alpha plaster use autoclave technology. One process consists of applying steam at a pressure of 117 kPa at 123° C. for 5–7 hours on lumps of natural gypsum. A concentrated magnesium-containing solution or slurry autoclave process was described by Schoch and Cunningham in 1940 ("Production of Gypsum plaster by Wet Methods" Meeting of the American Society of Chemical engineers New Orleans La. (1940). U.K. Patent No 1,079,502 published Aug. 16, 1967 describes use of a crystal-modifying succinic or malic acid to produce the alpha form from a slurry autoclave system. Hoggatt, U.S. Pat. No. 2,616,789, published Nov. 4, 1952 describes a solution process which does not use pressure but instead uses a concentrated calcium chloride (30 wt %) to allow temperatures above 120° C. to be obtained without an autoclave.

Production of alpha plaster using acids has been known for some time. Schoch and Cunningham (ibid) reported dehydration by nitric acid. Research and pilot plant work using sulfuric acid is described in "Construction and Operation of a Pilot Plant for the production of High Quality Stucco for Mine Mortars", Research Report, BMFT-FB-86-088, Deuster D. German Ministry for Research and Technology, Dec. 1986). This process was not successful because it is extremely difficult to produce alpha plaster without considerable amounts of anhydride. Hemihydrate can only be formed in a narrow range of temperatures and acid concentrations and outside of this range, formation of anhydride can be practically instantaneous (Kuntze R. A. et al "Utilization of Waste derived Gypsum for Mine Backfill" International Symposium on Tailings and Effluent Management, Halifax NS Aug.1989).

Conditions for production of alpha plaster from natural gypsum do not work for FGD wastes. Commercial production of alpha plaster from FGD wastes has, thus, as yet not been successful.

FGD sludge waste containing calcium sulfite has been disposed of in several ways. It can be used to substitute for natural gypsum after being converted into calcium sulfate dihydrate by oxidization with air. This application is limited by a low market demand. It is also common to dispose of FGD waste by sending it to landfill. However, sulfite in the FGD waste can be oxidized and thus, consume oxygen to pose a toxicity threat. Accordingly, if sulfite leaches into groundwater, oxygen is consumed and aquatic species, such as fish may die. Further, disposal by landfill increases the overall cost of flue gas desulfurization because of tipping fees.

Basically, processes for producing α-HH are roughly classified into three types. They are steam autoclaving, slurry autoclaving and solution processes at atmospheric pressures. The so-called solution process has produced α-HH by suspending gypsum powder in an aqueous solution containing relatively concentrated inorganic/organic salts and acids and heating the resulting suspension to the boiling point of the aqueous solution at atmospheric pressure for a time sufficient to complete conversion of DH to α-HH. The limitations of the reported solution processes are that very concentrated salt solutions are required to raise the boiling point; that the concentrated solutions are difficult to removal from the product; that the concentrated solutions require very careful process control since the product can quickly dehydrate to the undesirable anhydride form; that the concentrated solutions are corrosive; that the concentrated solutions add expense to the process; and further that the concentrated solutions create a waste water disposal problem.

In general, the salts and acids added have physicochemical properties such as lowering the water partial pressure or equivalently increasing the boiling point of the solution, catalyzing the dehydration of gypsum, modifying crystal habit and promoting the rate of growth of the crystals. As is well known in the literature, a number of substances have been proposed to be used in the solution for transforming gypsum and also to a more limited extent, synthetic gypsum to α-HH. These additives include magnesium sulfate, magnesium chloride, calcium chloride, sodium chloride, sulfuric acid, nitric acid, phosphoric acid and the like as well as some alkali and alkaline earth metal salts of organic acids, such as calcium alkylaryl sulphonate, and magnesium sulfosuccinate salts. Besides the above mentioned substances, some organic acids and salts thereof have been suggested as crystal habit modifiers in low concentrations (0.1%–1%) in order to obtain the desired crystal habit. Succinic, citric and sulfosuccinic acid and salts thereof have been suggested for this effect. However, the limitations of the concentrated solutions remain and solutions suitable for use by industry remain an elusive goal.

To obtain good crystals of α-HH, generally the residence time of solids in the solution has to be long enough to allow crystal growth. Unfortunately, α-HH is not stable in aqueous solution and the time required to grow large crystals in those solutions reported in the prior art, particularly in sulfuric acid solutions is too short to be of commercial interest. Further the stability of α-HH is extremely sensitive to the changes in both composition and temperature of the solution. It has been reported that α-HH is only stable for a short period in a sharply narrow range of either the temperature or the composition of the heating media.

There, thus, remains a significant demand for a process that provides for the economic manufacture of α-HH.

SUMMARY OF THE INVENTION

It is an object of the present invention to provide an economical manufacturing process for α-HH.

It is a further object to provide an improved plasterboard/wallboard article comprising αHH made from said process.

Surprisingly, we have found that the presence of a relatively small amount of a polyhydric alcohol provides a stabilizing effect for αHH in hot, aqueous, acidic solution.

Accordingly, in its broadest aspect the invention provides a process for the production of αHH from FGD sludge, said process comprising treating an aqueous slurry of said sludge and a stabilizing effective amount of a stabilizing polyhydric alcohol to stabilize said αHH to obtain αHH crystal growth, at atmospheric pressure and a temperature greater than 80° C. and a pH selected from 3 to 6.

The preferred FGD sludge of use in the practise of the invention is a calcium sulfite-containing sludge. The pH of the aqueous slurry is preferably adjusted by the addition of sulfuric acid.

By the term "polyhydric alcohol" in this specification and claims is meant soluble organic compounds having at least two hydroxyl groups, notwithstanding there may be other organic functional groups present, e.g. an aldehyde or keto group in a simple carbohydrate, e.g. glucose, sucrose, fructose. The stabilizing polyhydric alcohol is used in a stabilizing effective amount readily determinable by the skilled person.

Preferred examples of stabilizing polyhydric alcohols includes glycols, such as ethylene glycol and glycerol, in amounts preferably selected from 0.2%–5% w/w of aqueous slurry.

Most preferably, glycol is present in an amount selected from 1%–2% w/w of aqueous slurry which satisfactorily extends the time under the aforesaid process conditions as defined for large crystals of αHH to be formed. In this specification and claims %w/w means percentage weight of the combined weight of the liquid and dissolved solids constituting the slurry, unless otherwise stated.

Magnesium ion is preferably present in a catalytic effective amount to enhance conversion of the sulfite present in the FGD to sulfate, typically in the range 0.5%–5% w/w and preferably 1%–2% w/w. Chloride ion may be, optionally, present in an amount of 0.2%–5% w/w.

A crystal habit modifier polycarboxylic acid is, preferably present in an amount selected from 0.5%–5% w/w. Examples of polycarboxylic acids are di- and polycarboxylic acids, saturated and unsaturated, such as succinic acid, sulphosuccinic acid, maleic acid, malic acid and citric acids. These entities may be added to the slurry as either free acid or as a water-soluble salt thereof. Most preferably, succinic acid in an amount of 1.5%–2.5 % w/w is present.

Preferably, a sufficient oxidant is added to the slurry to provide efficacious, enhanced oxidation of the sulfite to sulfate. Hydrogen peroxide is a most preferred oxidant and, typically, added part-way through the heating step in an overall amount selected from 0.5%–5% w/w, most preferably 1%–2% w/w.

In the general process of the present invention conducted under atmospheric pressure, FGD solid is slurried (10%–30% w/w solids content) in an aqueous mixture comprising the ingredients as hereinabove defined. For example, 60 g FGD and 180 g aqueous mixture are combined to result in a combined 240 g aqueous slurry. The aqueous slurries of use in the practice of the invention have relatively low total soluble salt concentrations e.g. preferably less than 25 g/l. The aqueous slurry is heated to about 80° C. and the pH adjusted by the addition of either acid or further FGD. The temperature is subsequently raised to between 90°–95° C. for about an hour and, optionally, αHH seed crystals added to enhance crystal formation. The temperature is raised further to or near the boiling point of about 102°–104° C., held there for about 2 hours and the oxidant, such as hydrogen peroxide slowly added. The mixture is maintained at this temperature until the αHH crystals are of a sufficiently large, desired size.

As a general guide, we have found that, ordinarily, the processes as hereinabove defined effect, essentially, complete crystallization of αHH in about 3–8 hours at a pH of 3.5 to 4.0, and in about 12 hours at a pH of 4.5 to 6.

We have found that the crystal shape of αHH is also influenced by the pH value of the suspension. Needle-like shaped crystals are produced at a pH below 3.5, while short and squat columns are produced at and above pH4 up to the neutral range. Additionally, the solid-to-liquid ratio of the suspension is capable of influencing the size of the generated crystals. Moreover, the amount of seed crystals added influences the rate of crystallization and the shape and the size of the generated crystals.

In further aspects of the invention there is provided αHH plaster as prepared by the process of the invention as hereinabove defined and wallboard/plaster board comprising said αHH plaster according to the invention.

Wallboard/plaster board comprises 1–2 cm thick plaster retained between planar cardboard/paper sheets, typically, 4 feet by 8 feet in dimension as is known in the art.

BRIEF DESCRIPTION OF THE DRAWINGS

In order that the invention may be better understood, preferred embodiments will now be described by way of example only, with reference to the accompanying drawings wherein.

We have surprisingly found that advantageous continued crystal growth can be effected over relatively long periods Of time without undesirable anhydride formation. This is an advantage for continuous operation and for ease of industrial control. Thus, unusually large αHH crystals have been produced by this method i.e. they have larger aspect ratios than the commercial varieties. The crystals generally have a width to length ratio of 1:1, which is unusually stubby and have a water demand of less than 40 ml/100 g.

The crystals are removed, from the resultant slurry, preferably by filtration, at a temperature greater than 60° C. and subsequently air dried at 40°–90° C. to a constant weight.

The essence of the present invention resides in the discovery that relatively small amounts of a polyhydric alcohol stabilizes the αHH formed under the process conditions as hereinbefore defined for vastly greater periods of time than in the absence of such a stabilizer, e.g. by at least by a factor of 10. This enables crystals to grow to a beneficially large size to provide commercial industrial applicability both for the manufacture of αHH and disposal of FGD wastes.

DETAILED DESCRIPTION OF PREFERRED EMBODIMENTS

ANALYSIS OF αHH and βHH

Figure 1:
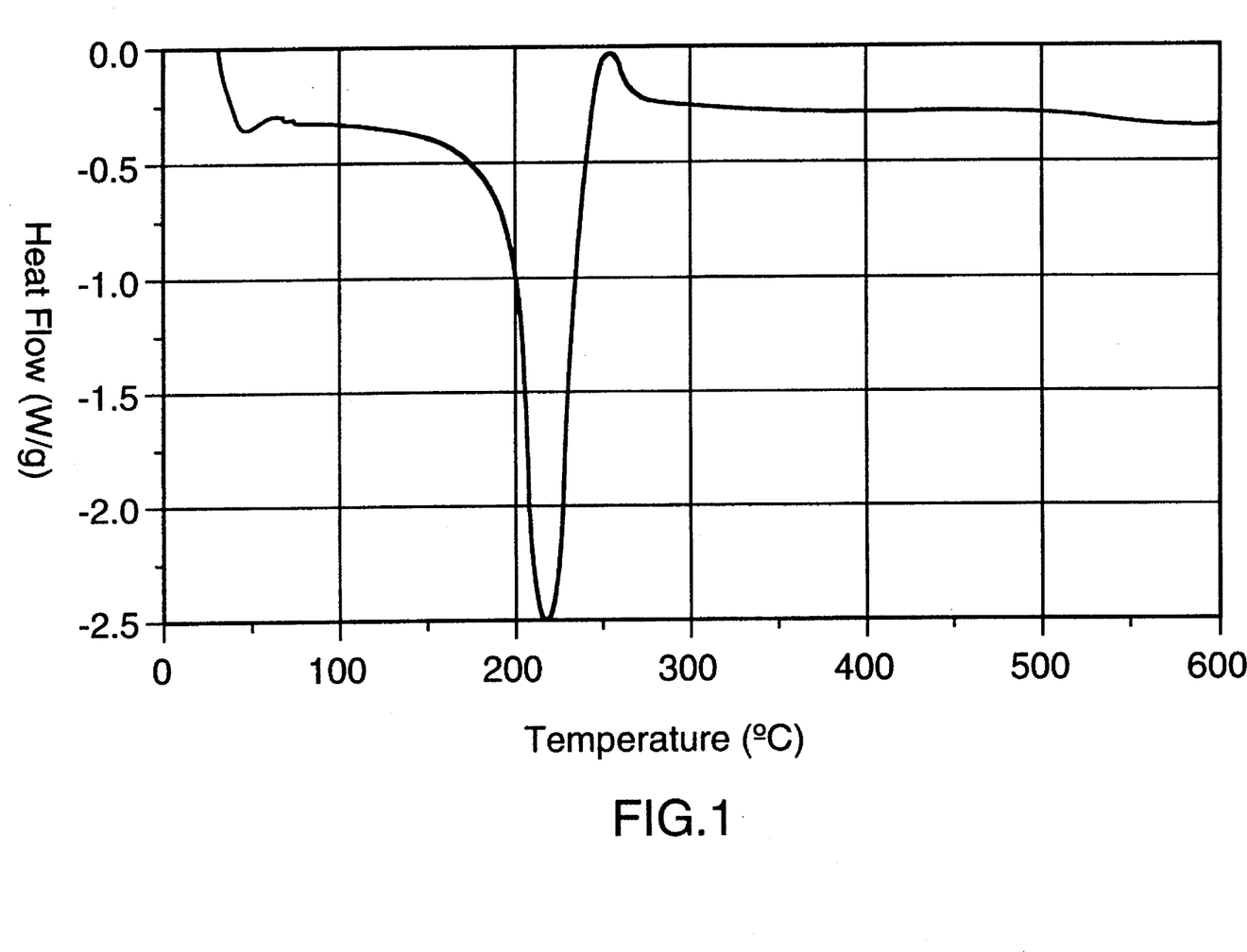
FIG. 1 represents a Differential Scanning Calorimeter chart (25°/m to 600° C.) of a commercial sample of αHH.

FIG. 1 shows a DSC (Differential Scanning Calorimetry) analysis of a commercial αHH. The vertical axis shows the heat absorbed by the sample as it is heated at 25° C. per minute, while the horizontal axis shows the temperature of the sample. The chart shows an endotherm, i.e. a rapid increase in the amount of heat being absorbed by the sample above 200° C. (ie more negative heat flow values as the temperature increases). This is caused by the dehydration of the 0.5 $H_2O$ in each calcium sulfate molecule. The distinguishing feature for αHH is the exotherm (the peak in the positive heat flow direction) immediately following the dehydration peak. A smaller peak at higher temperatures (450° C.) is the conversion of the soluble anhydrite to its more stable insoluble form. The magnitude of the exotherm peak is an indication of the purity of the αHH. In the samples of αHH prepared according to this patent to be shown later the exotherm peak will be observed to be bigger than the peak from commercial samples. Thus the prepared samples are purer than commercial grade.

Figure 2:
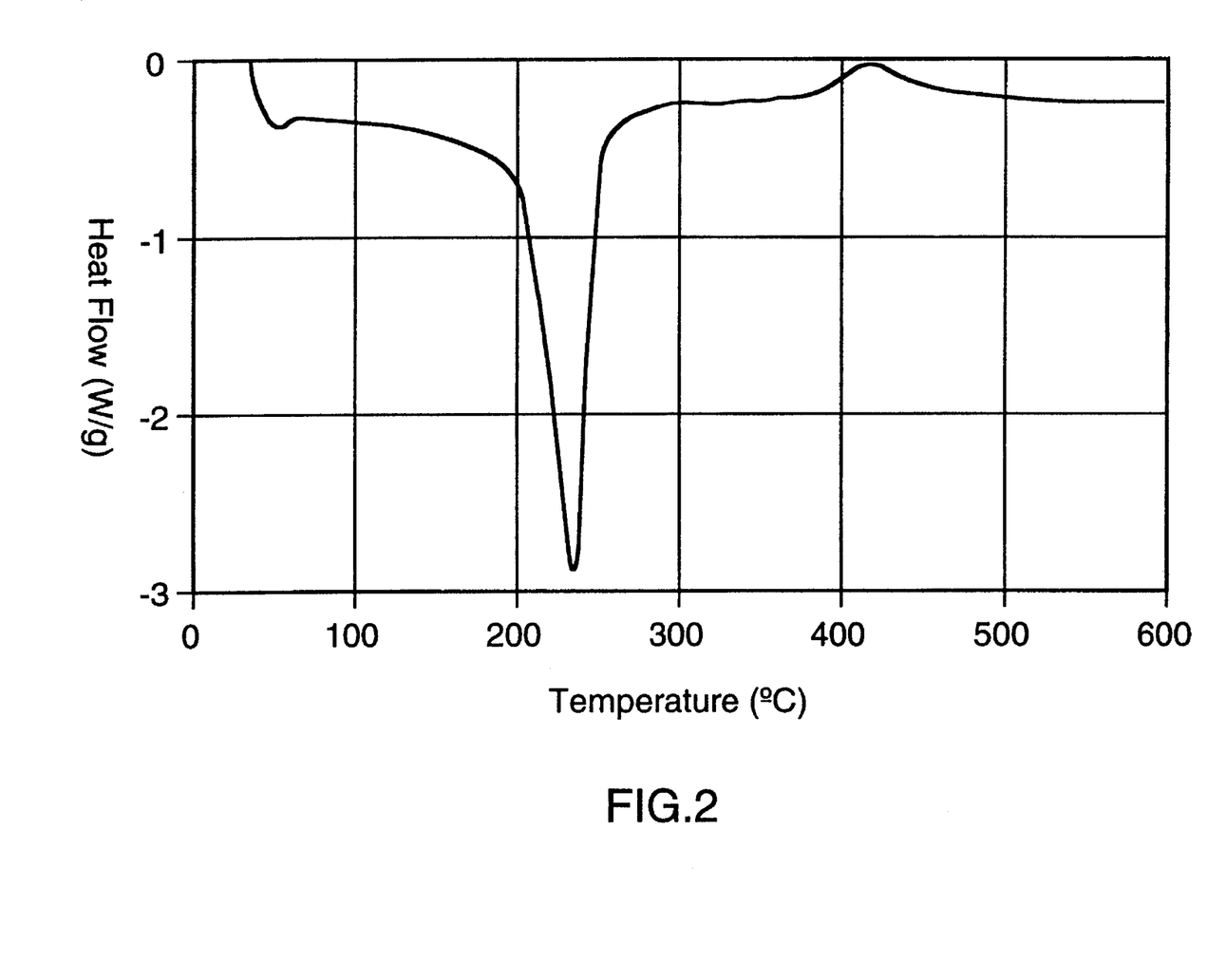
FIG. 2 represents a Differential Scanning Calorimeter chart (25°/m to 600° C.) of a commercial sample of a βHH made from FGD sludge.

FIG. 2 shows a DSC analysis of a commercial βHH. The vertical axis shows the heat absorbed by the sample as it is heated at 25° C. per minute and the chart also shows an endotherm. This conversion to soluble anhydrite occurs about 10°–20° C. earlier than the αHH dehydration to soluble anhydrite. Unlike the αHH form, there is no exotherm following the dehydration peak. A smaller peak at higher temperatures(450° C.) is the conversion of the soluble anhydrite to its more stable insoluble form.

Figure 3:
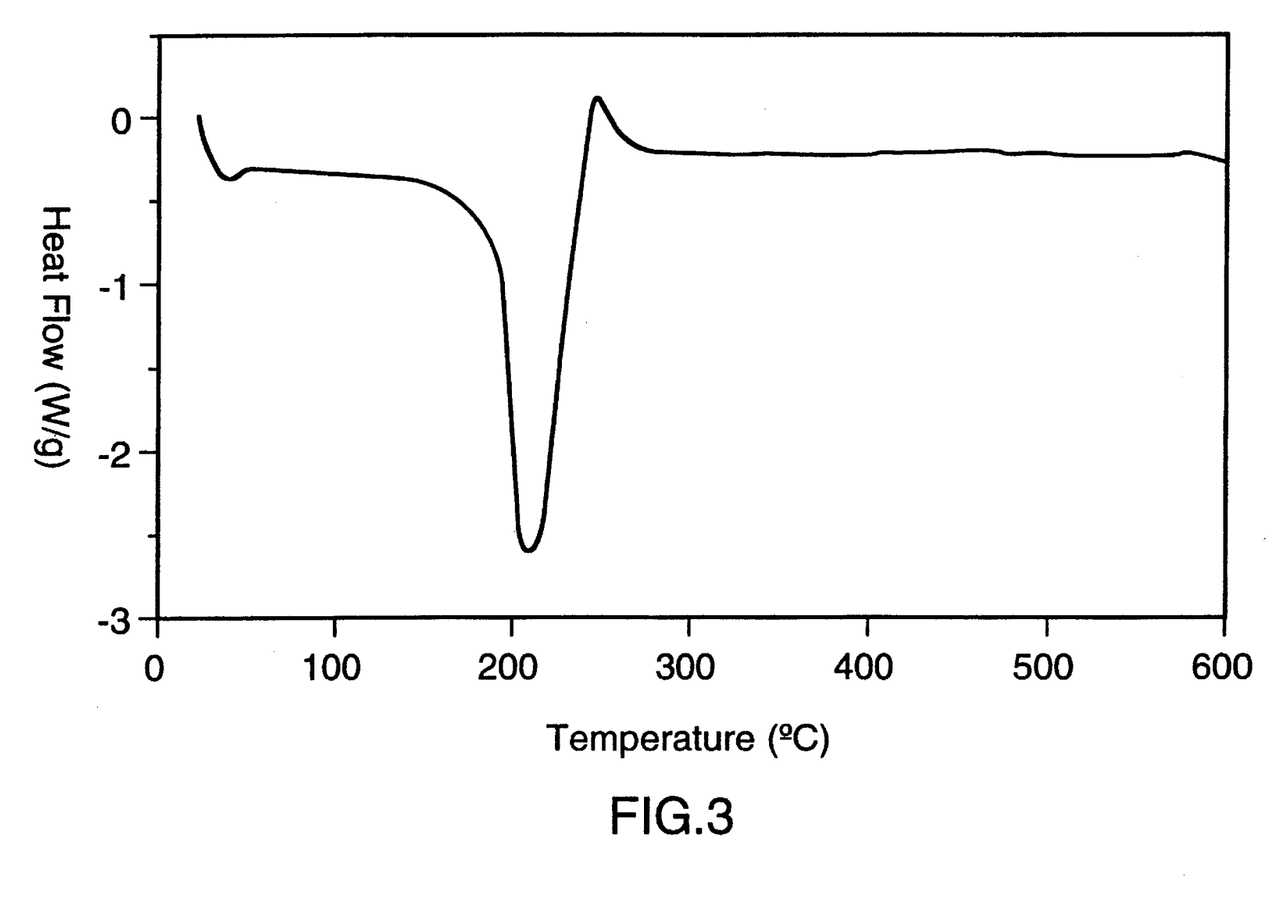
FIGS. 3, 4 and 5 represent Differential Scanning Calorimeter charts (25°/m to 600° C.) of samples of αHH prepared according to the processes of the present invention.
Figure 4:
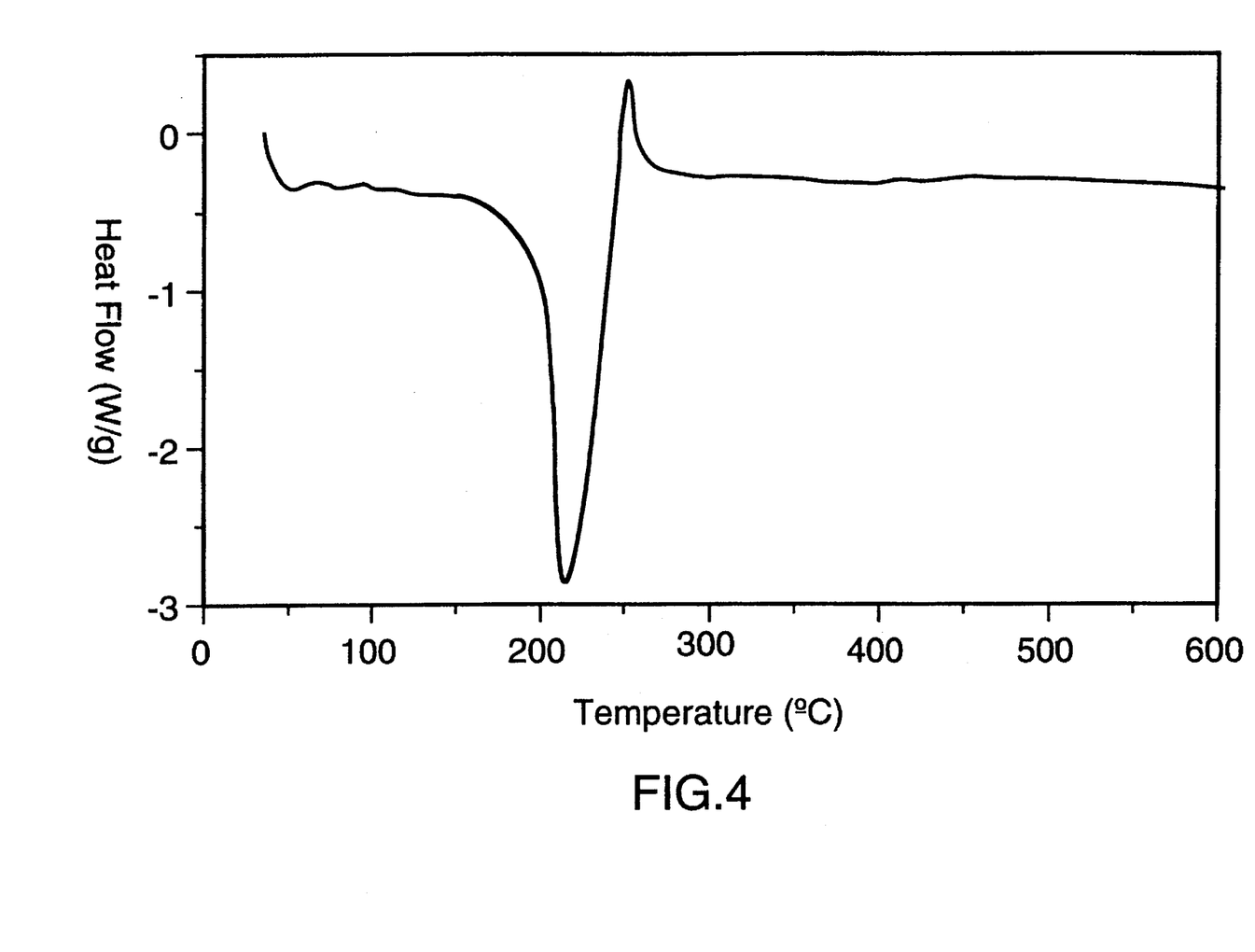
Figure 5:
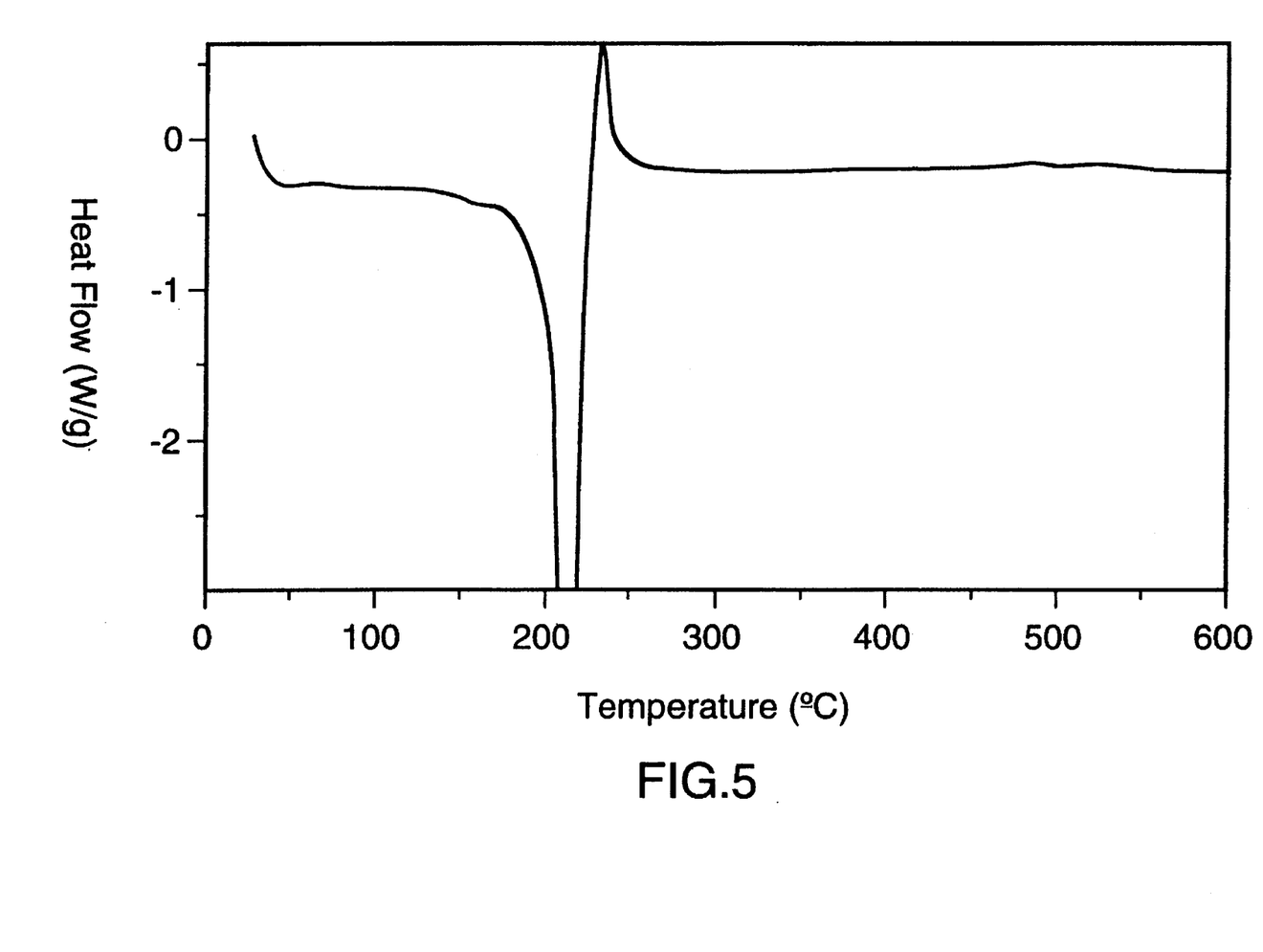

FIGS. 3, 4 and 5 are described hereinbelow with reference to the appropriate examples.

EXAMPLES

FGD waste may be converted to αHH under the following process conditions:

acid, preferably sulfuric acid should be added to provide a pH selected from 3.5 to 6. For pH <3 needle-like crystals are formed. Higher pH values produce shorter columnar crystals;

magnesium from all sources including FGD materials, should be, preferably, increased to a concentration of 1%–1.5 % w/w. This acts as an accelerant for crystallization. Although the desired form of αHH can be produced without Mg addition, the αHH formation times are relatively longer e.g. 36 hours;

chloride from all sources may, preferably, be increased to 0.2%–3.5 % w/w, (but, most preferably, not by the addition of alkali metal chlorides);

a crystal habit modifier such as succinic acid may be added to 0.5%–3 % w/w (about 2% is optimal).

The general experimental procedure used in these examples is described as follows.

Initially, a slurry of about 170 g of the liquid mixture given above was added to a 500 mL 3 necked round bottom flask provided with stirring and then heated to 80° C. About 50 g FGD solids was added to the solution, while stirring. The pH was adjusted to the range 3.5–5 by additional acid addition or by additional FGD addition. The temperature is then raised to 90°–95° C. for an hour. αHH seed crystals may be added at this stage to speed the crystal formation but are not essential. The temperature is then raised to near the boiling point 102.5° C. for 2 hours then the peroxide is slowly added. The solution is held at this temperature until the crystals are sufficiently large. By removing a small sample of crystals from the reactor and looking at the shape and size reveals whether sufficient time has been allowed. When the crystals are sufficiently well formed, the slurry is filtered from the solution and washed with hot water and dried at 90° C. An advantage with this solution chemistry is that crystal growth is stable for very long times and does not convert to the anhydrite form. This is an advantage for continuous operation and for ease of industrial control. Crystals having a width to length ratio of 1:1 can be produced. (These are unusually stubby and may be ideal for applications requiring very low water demand (<30 g/100 g solids) plaster). Unusually large αHH crystals have been produced by this method ie they are bigger than the commercial varieties.

Example 1

This Example demonstrates the desirable effect of low concentrations of a polyhydric alcohol in stabilizing the hemihydrate form of the product. Needle-like hemihydrate crystals were produced demonstrating that the desirable stubby form requires the control of pH within the specified range 3.5–6.

Following the general procedure above, 200 g of 24% sulfuric acid, 1.5% succinic acid, 3.3% magnesium sulfate, and 0.5% magnesium chloride were added to the vessel, heated to 100° C. and slurried with 60 g of sludge(dry basis). The pH was less than 3. The results showed that the needle shaped crystals of the hemihydrate that formed were stable for 100 minutes. Repeating the experiment at 105° C. revealed that the crystals were stable for only 30 minutes. At longer times only anhydrite was found.

A second experiment was conducted in the same manner but with the addition of 0.5% ethylene glycol. The hemihydrate crystals that formed were stable for 800 minutes and 400 minutes at 100° and 105° C., respectively.

Thus, it can be concluded that the glycol extends the time available for formation of the hemihydrate but is not sufficient for forming the desired form of αHH.

Example 2

Using the procedure outlined above, 71 g of 31.5% sulfuric acid +65 g of 18% v/v hydrochloric acid solution +20 g of water +2.2% succinic acid +4.9%magnesium sulfate +1.1% magnesium oxide +1.4% glycerol were added to the vessel and heated to 90° C. 43.6 g of FGD were slurried with the solution and after 1 h 1.2% hydrogen peroxide was slowly added. The resulting pH was 3.5. After 5 hours the product was removed and washed with hot water then dried at 90° C. The material obtained was clear in color, short columnar crystals with an aspect ratio of 1:3. Water demand was 35 to 40 mL/100 g. DSC analysis shown in FIG. 3 displays the exotherm peak characteristic of αHH. No trace of the β peak was found. Thus, the crystals formed were αHH. A comparison of the DSC analysis of the commercial αHH (FIG. 1) and Example 2 αHH (FIG. 3) reveals that the exotherm peak is larger for the Example 2 αHH and hence is a "purer" product.

Example 3

The same components as in Example 2 were used, except that only 45 g of FGD was used and resulted in a pH of 4.0. After 7 hours reaction time, the crystals were stubby with an aspect ratio of 1:2.5. Water demand was <35 mL/100 g. A DSC analysis shown in FIG. 4 displays the exotherm peak characteristic of αHH. No trace of the β peak was found. Thus the crystals formed were αHH. A comparison of the DSC analysis of the Example 3 αHH (FIG. 4) with the commercial αHH (FIG. 1) and the Example 2 αHH reveals that the exotherm peak is larger for the Example 3 αHH and hence is a "purer" product. Similarly the water demand for the Example 3 αHH is less than for the Example 2 αHH.

Example 4

The same components as in Example 2 were used except that only 47.4 g of FGD was used which resulted in a pH of 5.0.

After 9 hours, the crystals were very stubby with an aspect ratio of 1:1. Water demand was <33 mL/100 g. A DSC analysis shown in FIG. 5 displays the exotherm peak characteristic of αHH. No trace of the β peak was found. Thus, the crystals formed were αHH. A comparison of the DSC analysis of the Example 4 αHH (FIG. 5) with the commercial αHH and other examples shows an unusually large exotherm indicating the excellent quality of the αHH product. Accordingly, a requirement for this product is a relatively long crystallization time.

The conditions for these experiments are summarized below with the results summarized in Table 2

Experiment N28 conducted at a pH of <3 did not produce the desired form of αHH.

| CONDITIONS | |
| --- | --- |
| Sulfuric acid solution (31.5%) | 71 g |
| Hydrochloric acid solution (18% v/v) | 65 g |
| water | 20 g |
| Seed crystals | 3.0 g |
| Succinic acid | 2.2% |
| Magnesium sulfate | 4.9% |
| Magnesium oxide | 1.1% |
| Glycerol | 1.4% |
| Hydrogen peroxide | 1.2% |
| Ratio of FGD sludge solid to liquid required to give pH values below | |
| Expt N28 pH < 3.0 | 25.0% |
| Example 2 pH 3.5 | 25.8% |
| Example 3 pH 4.0 | 26.6% |
| Example 4 pH 5.0 | 28.0% |

TABLE 2

| Expt No. | pH | α HH Aspect Ratio | Reaction Time (hr) | Description of Crystal Product. |
| --- | --- | --- | --- | --- |
| N28 | <3. | 1:20+ | <1.0 | Needle-like, water demand >50 g/100 g |
| 2 | 3.5 | 1:3 | 5 | |
| 3 | 4.0 | 1:2 | 7 | Short columnar with water demand 35–40 g/100 g Short hexagonal cubes with water demand <35 g/100 g |
| 4 | 5.0 | 1:1 | 9 | Almost spherical crystals with low water demand <33 g/100 g |

Example 5

This example demonstrates that by operating the process within the ranges as defined by the invention different sources of FGD may be successfully converted to αHH.

FGD sludge #1 had 0.89% $MgSO_3$ 0.78% $CaCl_2$

FGD sludge #2 had 3.18% $MgSO_3$ 2.34% $CaCl_2$

FGD sludge #3 had 1.20% $MgSO_3$ 0.31% $CaCl_2$

Each of these sludges was tested as given in Example 2 but with the pH of 4.0 and the total Mg adjusted to 2.57% by the addition of magnesium chloride and oxide, with the total soluble chloride ion concentration being adjusted to 3.1% by the addition of calcium and magnesium chloride.

The results show that all three FGD sludges produced stubby crystals with aspect ratios of 1:1 to 1:2. The crystals of each of the three samples had water demands of 30 to 33 g/100 g. The DSC analyses showed the characteristic alpha exotherm peak and no evidence of any beta form. Thus the product in each case was a good quality αHH.

Although this disclosure has described and illustrated certain preferred embodiments of the invention, it is to be understood that the invention is not restricted to those particular embodiments. Rather, the invention includes all embodiments which are functional equivalents of the specific embodiments and features described and illustrated.

We claim:

1. A process for the production of alpha hemihydrate calcium sulfate (αHH) from FGD sludge, said process comprising treating an aqueous slurry of said sludge and a stabilizing effective amount from 0.2%–5% w/w of aqueous slurry of a stabilizing polyhydric alcohol to stabilize αHH produced to obtain αHH crystal growth, at atmospheric pressure and a temperature greater than 80° C. and a pH selected from 3 to 6.

2. A process as defined in claim 1 wherein said aqueous solution comprises a accelerant effective amount of Mg++ ion to enhance crystallization of said αHH.

3. A process as defined in claim 1 further comprising adding an effective amount of a modifying polycarboxylic acid, or a soluble salt thereof, to modify the crystal habit of said αHH.

4. A process as defined in claim 1 further comprising adding an effective amount of chloride ion to enhance solubilization of calcium ions into solution.

5. A process as defined in claim 1 further comprising adding an oxidant to said FGD sludge.

6. A process as defined in claim 1 wherein said aqueous slurry is heated at or near its boiling point.

7. A process as defined in claim 1 further comprising removing said αHH from said aqueous slurry.

8. A process as defined in claim 7 wherein said αHH is removed from said aqueous slurry by filtering said slurry wherein said slurry has a temperature greater than 60° C.

9. A process as defined in claim 1 further comprising adding Mg++ ion to provide a concentration selected from 0.5%–5% w/w of said slurry.

10. A process as defined in claim 9 wherein said Mg++ ion is at a concentration selected from 1%–2% w/w of said slurry.

11. A process as defined in claim 3 wherein said polycarboxylic acid is selected from the group consisting of succinic acid and a succinic salt at a concentration selected from 0.5 to 5% w/w of said slurry.

12. A process as defined in claim 1 wherein an oxidant is added in an amount of 1%–5% w/w of said slurry.

13. A process as defined in claim 1 wherein said polyhydric alcohol is selected from the group consisting of ethylene glycol, glycerol and a sugar.

* * * * *